INVENTOR
Peter Dudley Church
BY
Misegades & Douglas
ATTORNEYS

United States Patent Office 3,488,648
Patented Jan. 6, 1970

3,488,648

SELF-LOADING FLUID BEARING SUPPORT MEANS FOR DATA RECORDING-SENSING HEADS

Peter Dudley Church, London, England, assignor to English Electric Computers Limited, London, England, a British company Filed Apr. 5, 1967, Ser. No. 628,625
Claims priority, application Great Britain, Apr. 5, 1966, 15,101/66
Int. Cl. G11b 5/00
U.S. Cl. 340—174.1 7 Claims

ABSTRACT OF THE DISCLOSURE

In a magnetic data recording-sensing apparatus movement of magnetic heads 23 from "parked" positions to stable "operative" positions (and vice versa) is effected automatically in dependence upon the speed of the associated record surface 16 by allowing the pressure under one (19) of two steps 18, 19 in pressure generating surfaces 17 carrying the heads to control the inflation of a bellows 11 supporting the pressure generating surfaces and heads.

This invention relates to means for supporting a data recording-sensing head in an operative position adjacent a record surface whereby to enable data signals to be recorded on or sensed from the record surface.

Such heads are found for example in magnetic data storage apparatus now commonly used in conjunction with electronic data computing or processing installations as random access storage devices. In such storage devices the record surface is provided on a rigid rotatable member which in operation is driven at high speed, and data is recorded in parallel concentric tracks by one or more heads which are carried on, and are positioned by, adjustable supporting arms. For various reasons including those of economy in electric recording power, of sensitivity of detection of recorded data, and of high density of data storage, it is desirable to reduce as far as possible the gap between each head and the moving record surface.

It has been shown that if a head is provided with, or is mounted in, a suitable pressure generating surface which faces the record surface a layer of air lying adjacent the record surface and carried with it prevents the head coming into contact with the record surface. A considerable air pressure can be developed in the gap between the said surface of the head or head supporting member and the record surface, and the gap dimension can be controlled by applying to the head or head supporting member a force of appropriate magnitude urging the head or its supporting member towards the record surface.

Air pressure responsive actuators have been used for urging the head or its supporting member towards the record surface against the action of biasing means which are effective to bias the head to a parked position. These actuators have been supplied from an external source of air under pressure. With this arrangement the disadvantage arises that should the record surface slow down the air pressure urging the head away from the record surface falls, so that under the influence of the actuating means the head could come into contact with the record surface and so cause irreparable damage. Furthermore, interlocking means must be provided to prevent the actuating means being supplied with air under pressure when the record surface is at rest, or otherwise running at a low speed.

According to the present invention the actuating means is arranged for supply with air (or other fluid in which the record surface moves), under pressure derived from a position in the gap between the pressure generating surface and the record surface.

According to one preferred feature of the present invention the pressure generating surface is shaped to produce in the gap a region in which the fluid pressure changes with variation of the distance separating the head supporting means and the record surface, when the head is within a predetermined small range of positions disposed about the operative position, at a rate lower than that at which the pressure changes in other parts of the gap with such variation, and the fluid pressure responsive actuating means is arranged for supply with fluid derived from a position in the said region in the gap.

According to another feature of the present invention the pressure generating surface may also be shaped to produce in the said region in the gap a fluid pressure which changes with variation of the distance separating the head supporting member and the record surface, when the head lies in a predetermined range of non-operative positions extending from a parked position towards the operative position, at a rate higher than that at which the pressure changes in other parts of the gap with such variation.

The shaping of the pressure generating surface may include two successive abrupt steps each extending across the direction of relative recording-sensing movement of the head supporting member and record surface, the height of the step nearer the trailing portion of the head supporting member being equal to at least a high proportion of the distance separating the head supporting member and the record surface when the head is at the operative position, and the height of the step nearer the leading portion of the head supporting member being equal to a substantial proportion of the said distance when the head is at the parked position.

The head supporting member may constitute a movable output member of the fluid pressure responsive actuating means and be subject at its surface remote from the record surface to the fluid under pressure supplied to the actuating means whereby to urge the head supporting member towards the record surface.

In such a case a hole piercing the head supporting member may communicate on one side thereof with the aforesaid position in the gap and on the other side thereof with a chamber of the fluid pressure responsive actuating means.

The actuating means may comprise a resilient pressure-tight bellows secured at one end thereof to the head supporting member and closed at the other end thereof by a closure member, the bellows holding the head supporting member with the head in the parked position when there is no relative recording-sensing movement of the head supporting member and record surface.

Restraining means coupling the closure member and the head supporting member may be provided whereby to restrain movement of the head supporting member relative to the closure member in the direction of relative recording-sensing movement of the head supporting member and record surface.

One electromagnetic recording-sensing head assembly for a magnetic data storage apparatus and embodying the present invention will now be described by way of example and with reference to the accompanying drawings in which.

Figure 1:
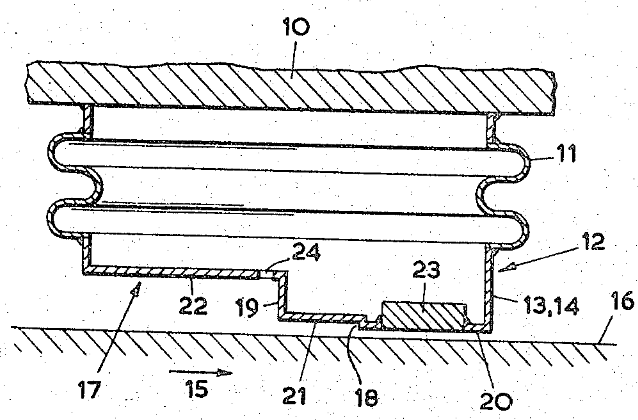
FIG. 1 shows a sectional elevation of the head assembly and an associated record surface, the elevation being taken on the section A—A of FIG. 2.
Figure 2:
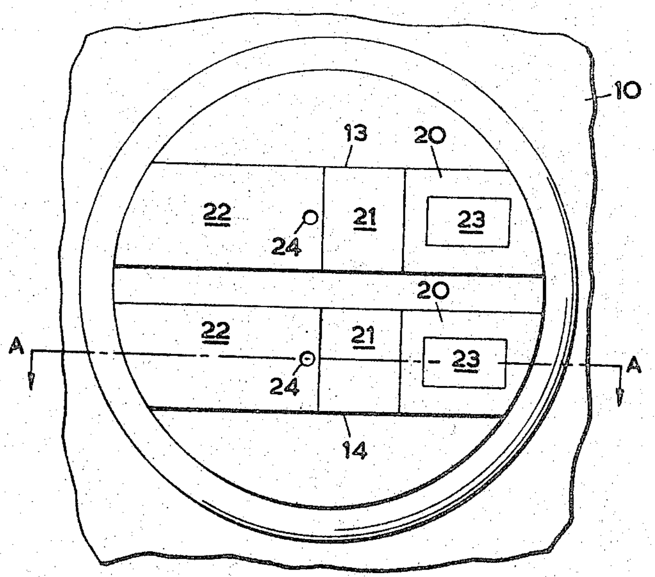
FIG. 2 shows an inverse plan view of the head assembly shown in FIG. 1.

Referring now to the FIGURES 1 to 5, the head assembly includes uppermost a carrier member 10 by means of which the assembly is carried on an adjustable positioning arm (not shown), a resilient metallic bellows 11 of generally cylindrical configuration sealed in a pressure tight manner to the lower surface of the carrier member 10, and a head supporting unit 12 sealed in a pressure-tight manner to the lower end of the bellows.

The head supporting unit includes two dependent head supporting portions 13, 14 disposed parallel to one another and aligned with the direction (arrow 15) of recording-sensing movement of a data record surface 16 with which the head assembly is arranged to co-operate.

Each head supporting portion has a stepped pressure generating surface 17 which faces the record surface and which incorporates two abrupt steps 18, 19 disposed behind one another in the said direction and normal to the said direction. The steps are of substantially different heights, that 19 nearer the leading end of the head supporting portion being relatively deep, and that 18 nearer the trailing end being relatively shallow.

The steps divide each head supporting portion into three lands 20–22, of which the lowermost 20, i.e. the land nearer the record surface, incorporates an electromagnetic data recording-sensing head 23 whose lower surface is flush with the surrounding land surface.

The uppermost land 22 of each head supporting portion is pierced by a through-hole 24 disposed near the deeper step 19 so that air may flow between the space enclosed by the bellows and the region adjacent the deeper step in the gap between the pressure generating surface and the record surface.

In the FIGURE 1 the bellows is shown in an extended condition such as to hold the two magnetic heads in the operative position closely adjacent the moving record surface 16. When the record surface is stationary, however, the bellows, in the absence of a suitably high internal air pressure, is of reduced length and so holds the heads 23 at a "parked" position with a much greater gap between the pressure generating and record surfaces. The approximate relative magnitudes of the gaps when the heads are in the operative and parked positions respectively are shown in the FIGURES 3 and 4 which depict in the upper parts thereof the outlines of the pressure generating and record surfaces.

Since the actions of the pressure generating surfaces 17 of the respective head supporting portions 13, 14 are similar, the action of the pressure generating surface of one head supporting portion only will be described in detail below.

Figure 4:
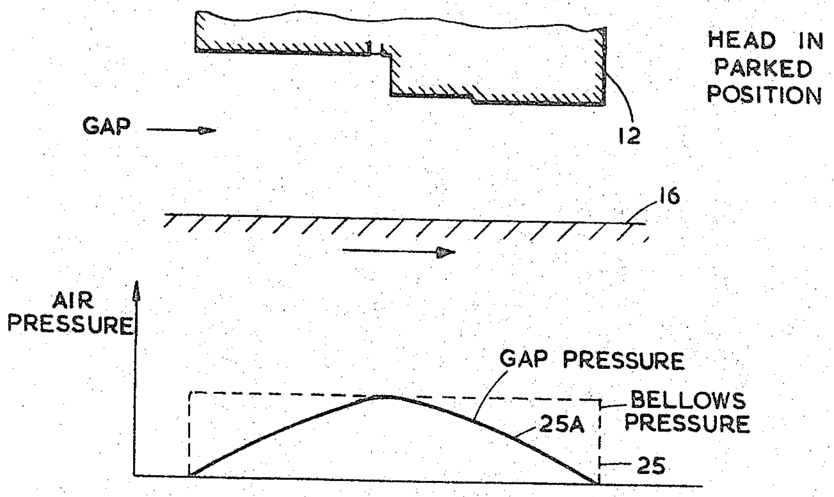
FIG. 4 shows a graph similar to that of FIG. 3, but for the condition where the head is in the parked position.

It will be observed from FIG. 4 that the leading step 19 has a height which is equal to a substantial proportion of the distance separating the record surface and the leading land 22 of the pressure generating surface when the head is in the parked position; furthermore that each trailing step 18 is of a height which is insignificant in relation to the distance separating the record surface and the leading and middle lands. Hence movement of the record surface in the recording-sensing direction (arrow 15) at the normal operating speed with the head in the parked position results in a pressure distribution in the gap of the form shown in FIG. 4. In this condition the deep step 19 is responsible for the production of a high pressure region beneath it, the pressure rising from atmospheric value at the leading end of the pressure generating surface and falling to atmospheric pressure at the trailing end. The shallow step contributes little to the form of the pressure distribution curve.

The high pressure in the region of the deep step extends through the hole in the leading land 22 into the space enclosed by the bellows, so that the head supporting portion is subject on its upper surface to this high pressure. This is illustrated in FIG. 4 by the broken line curve 25. The full-line curve 25A on the other hand illustrates the pressure applied to the lower surface i.e. to the pressure generating surface. From these two curves it will be apparent that the head supporting portion is subject to a resultant downward thrust tending to move the head towards the record surface. This resultant thrust overcomes the resistance to movement offered by the bellows, and other extraneous pressures, and the heads move from the parked position towards the operative position.

Figure 5:
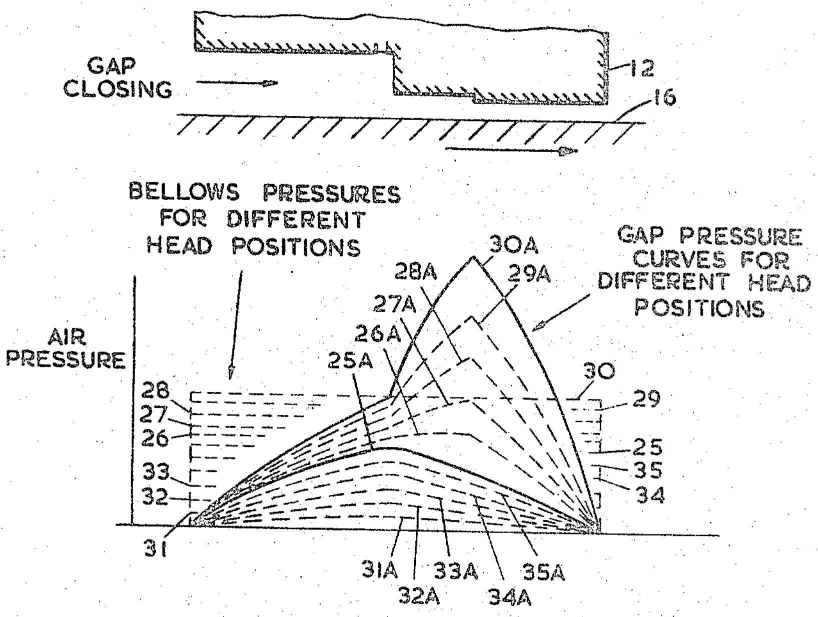
FIG. 5 shows a graph similar to that shown in FIG. 3 but depicting various pressure distribution curves appropriate to different distances separating the head and record surface.

This condition continues to exist, as the gap between the pressure generating and record surfaces closes, until the pressure distribution in the gap becomes influenced by the presence of the shallow step. This occurs when, with a reducing gap between the central land 21 and the record surface 16, the height of the shallow step 18 becomes significant in relation to that gap. By this time closing the gap further brings but little increase in the pressure under the deep step 19, so that the pressure distribution curve begins to change its form under the central and trailing lands 21, 20 only. As the gap closes the pressure developed by the shallow step increases at a high rate and soon exceeds the pressure due to the deep step by a substantial amount. FIG. 5 shows by the broken line curves 26A to 29A the air pressure distribution in the gap for various positions of the pressure generating surface. Since the air pressure inside the bellows is that generated by and at the deep step 19 the upper surface of the head supporting portion is subjected now to a pressure which is lower than the maximum generated in the gap, and consequently the head supporting portion is subjected to a resultant force, directed towards the record surface, which diminishes as the gap closes. The bellows pressures corresponding to the gap pressure curves 26A to 29A are depicted in FIG. 5 by the broken lines 26 to 29 respectively.

Figure 3:
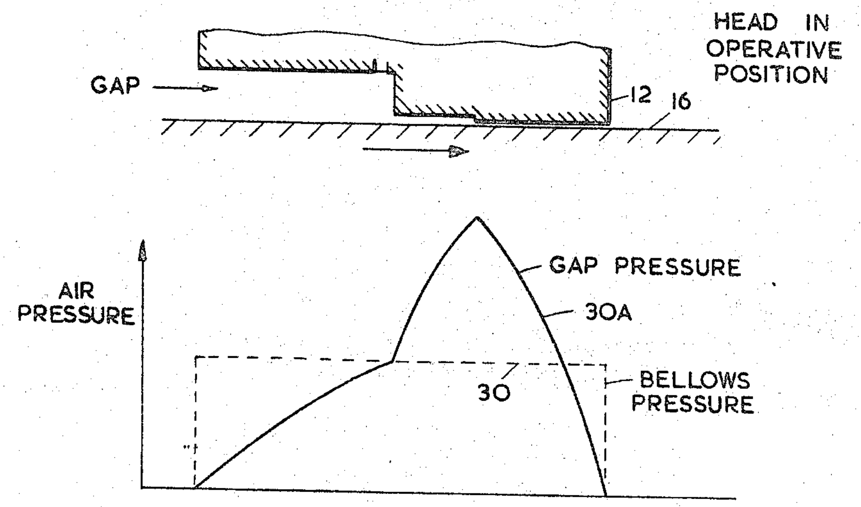
FIG. 3 shows in relation to an outline of the gap between the head assembly and the associated record surface a graph depicting the variation of air pressure in the gap when the head incorporated in the assembly is in the operative position.

Ultimately a condition of equilibrium is reached in which the head is in the operative position, and the thrust on the pressure generating surface, together with the bellows retracting force, just balances the force due to the pressure in the bellows. The broken- and full-line curves 30 and 30A in the FIGS. 3 and 5 depict the pressures existing in the bellows and in the gap respectively in this equilibrium condition.

If for any reason (e.g. the existence of an undulation in the record surface) the record surface moves momentarily closer to the head, the consequent closing of the gap increases the pressure generated under the shallow step 18, so that the pressure generating surface under the influence of the increased gap pressure (and relatively constant bellows pressure) moves away from the record surface to re-establish an equilibrium condition in which the head is in its correct operative position relative to the record surface. Likewise, if the record surface momentarily moves away from the head the consequent widening of the gap reduces the pressure generated under the shallow step, and the pressure generating surface is driven towards the record surface by the relatively constant bellows pressure, until the head is again positioned in its operative position relative to the record surface.

It will therefore be appreciated that the head assembly operates to maintain the heads at the operative position relative to the record surface, regardless of normal operational variations in the position of the record surface.

If the speed of the record surface is for any reason reduced below the normal recording-sensing speed, the air pressures in the gap fall, though the pressure distribution (for any particular gap dimension) remains substantially unaltered. This reduction in air pressure allows the bellows 11 to move the pressure generating surface 17 away from the record surface 16.

At a predetermined low speed the pressure generating surface becomes fully withdrawn, and the head lies in the parked position.

As the speed of the record surface is subsequently increased from the rest with the heads in the parked position the pressure distribution in the gap is generally similar to that shown in FIGS. 4 and 5 at curve 25A, though the magnitude of the maximum pressure increases from zero with increase in speed from zero value. The broken-line curves 31A–35A depict the pressure distribution curves applicable to different record surface speeds, whilst the corresponding bellows pressures are indicated by the broken-line curves 31–35.

It will therefore be appreciated that as the speed of the record surface increases from zero value on starting up the data storage apparatus the head supporting portions 13, 14 are subjected to an increasing force tending to move them towards the record surface. At a predetermined high speed this force is sufficient to extend the bellows and close the gap between the pressure generating surfaces and the record surfaces. As the gap becomes very small the head supporting portions are subject to rapidly rising control forces which act to prevent the heads approaching too close to the record surface, and maintain the heads in the operative position.

It will also be appreciated that no other means have to be provided for moving the heads between the operative and parked positions; that on the slowing-down of the record surface the heads are automatically retracted to the parked position; and that movement of the heads from the parked position to the operative position is automatic when the speed of the record surface is high enough.

In one head assembly the height of the shallow step 18 is approximately twice the distance separating the head when in the operative position and the record surface; the height of the deep step 19 is of the order of 10 times that of the shallow step 18; and the distance separating the head when in the parked position and the record surface is approximately 5 times the height of the deep step 19.

Figure 6:
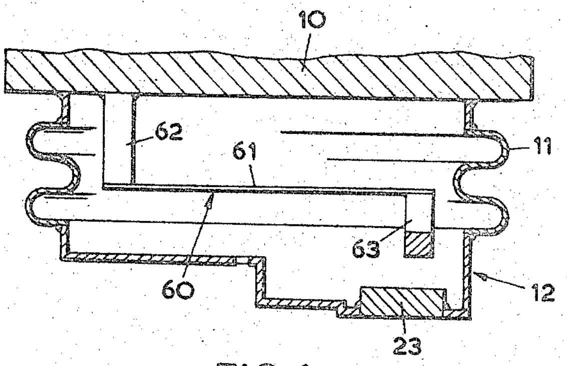
FIG. 6 shows a sectional elevation of a modified form of head supporting assembly.

In order to resist the tendency for the head supporting unit 12 to be displaced relative to the carrier member 10 in the direction of the recording-sensing movement of the record surface 16 by the layer of air carried by that surface the head assembly may be modified as shown in the FIG. 6 by the addition of restraining means 60 carried within the bellows 11. This restraining means includes two leaf springs 61 disposed side by side and aligned with the direction of recording-sensing movement of the record surface, the springs being anchored at one end on an anchorage member 62 secured to the underside of the carrier member 10, and at the other end on a second anchorage member 63 secured in the head supporting unit 12. The springs are arranged to restrain the movement of the head supporting unit in the direction of the record surface recording-sensing movement without materially impairing the freedom of the head supporting unit to move the heads between the parked and operative positions.

Whilst the head assemblies described make use of both the deep step and the shallow step, it is possible to use the deep step only for the purpose of effecting automatic advancing and retracting of the heads relative to the record surface, provided that other means are provided for stabilising the heads at the operative position.

Though abrupt steps have been used to create the desired high pressure regions in the gap, other configurations of the pressure generating surface may be used to create the desired pressure distributions in the gap.

Whereas in the head assemblies described the head supporting unit 12 has constituted an output member of the actuating means for pressing the heads towards the record surface, the head supporting unit could in an alternative arrangement be coupled to an output member of a separate actuating means which is supplied with air under pressure from the region under the deep step 19. Such a separate actuating means could comprise a piston arranged to slide in a cylinder. Alternatively, the head supporting unit 12 could itself comprise a piston arranged to slide in a pressure-tight cylinder, the piston being retracted to a parked position by a bias spring.

I claim:

1. An apparatus for supporting a data recording head including a head support means, a data recording surface spaced apart from said head support means, said head support means having a pressure generating surface for generating a fluid pressure as a result of relative movement between said head support means and the recording surface, the pressure generating surface having first and second portions for producing first and second fluid pressure components, respectively, actuating means responsive to fluid pressure in said gap for maintaining said head support means in a non-operated position relatively remote from said recording surface during periods of no relative movement and for urging said head support means toward an operated position closer to said recording surface during said relative movement, said first portion being at a substantially greater distance from said recording surface than said second surface portion, while said head support means is in an operated position such that said second pressure component primarily controls positioning of said head support means about said operated position, while about said non-operated position, said first pressure component primarily controls positioning of said head support means.

2. An apparatus as claimed in claim 1 in which said head support means includes a member having a first step extending transverse to the direction of said relative movement, said step defining said first and second portions of said pressure generating surface, said first portion being adjacent the leading edge of said member in the direction of said relative movement and said second portion being adjacent the trailing edge of said member, said second portion having a second step, smaller than said first step and extending in a direction parallel to said first step.

3. An apparatus as claimed in claim 2 in which said first step is maintained relatively remote from said recording surface when said head support means is in a non-operated position and in which said second step is substantially closer to said recording surface when said head support means is in an operated position.

4. An apparatus as claimed in claim 3 in which said second step divides said second portion into first and second levels, said first level located between said first and second steps, said second level located between said second step and the trailing edge of said member, the second level extending closer to the recording surface than said first level, and a data recording head mounted in said second level.

5. An apparatus as claimed in claim 1 in which, at a predetermined point in the first portion of the pressure generating surface of said head support means, a passage allows communication between the space, between said head support means and said recording surface, and said actuating means such that said actuating means is responsive to the fluid pressure in the space at said predetermined point.

6. An apparatus as claimed in claim 5 in which said actuating means includes a resilient pressure tight bellows connected at one end thereof to a bellows support member and at the other end thereof to said head support means.

7. An apparatus as claimed in claim 6 in which restraining means to inhibit relative motion between said head support means and said bellows support member are muonted inside said bellows, said restraining means including a leaf spring aligned substantially parallel with the direction of said relative movement, said leaf spring mounted on one end thereof to said bellows support member and at the other end thereof to said head support means.

References Cited

UNITED STATES PATENTS

| | | | |
|---|---|---|---|
| 2,937,240 | 5/1960 | Harker ---------- | 340—174.1 |
| 2,957,051 | 10/1960 | Epstein ---------- | 340—174.1 |
| 2,961,494 | 11/1960 | Darou ----------- | 340—174.1 |
| 3,123,677 | 3/1964 | Lauxen ---------- | 179—100.2 |

BERNARD KONICK, Primary Examiner

R. S. TUPPER, Assistant Examiner

U.S. Cl. X.R.

179—100.2